(12) United States Patent
Diez et al.

(10) Patent No.: US 8,342,336 B2
(45) Date of Patent: Jan. 1, 2013

(54) METHOD AND DEVICE FOR EXTRACTING NON-MAGNETIC ORES

(75) Inventors: Michael Diez, Erlangen (DE); Imme Domke, Mannheim (DE); Werner Hartmann, Weisendorf (DE); Hartmut Hibst, Schriesheim (DE); Wolfgang Krieglstein, Roβtal (DE); Alexej Michailovski, Mannheim (DE); Norbert Mronga, Dossenheim (DE); Michael Riebensahm, Santiago (CL); Wolfgang Schmidt, Erlangen (DE); Thomas Servay, Heidelberg (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 12/867,710

(22) PCT Filed: Feb. 10, 2009

(86) PCT No.: PCT/EP2009/051489
§ 371 (c)(1),
(2), (4) Date: Sep. 24, 2010

(87) PCT Pub. No.: WO2009/101070
PCT Pub. Date: Aug. 20, 2009

(65) Prior Publication Data
US 2011/0000826 A1    Jan. 6, 2011

(30) Foreign Application Priority Data
Feb. 15, 2008 (EP) .................................. 08002788

(51) Int. Cl.
*B03C 1/00* (2006.01)

(52) U.S. Cl. ......... 209/8; 209/3; 209/5; 209/39; 209/45; 209/66

(58) Field of Classification Search ................. 209/3, 5, 209/8, 39, 45, 66; 210/222
See application file for complete search history.

(56) References Cited

U.S. PATENT DOCUMENTS 2,979,202 A * 4/1961 Orbeliani .................. 209/223.1
(Continued)

FOREIGN PATENT DOCUMENTS

WO    02/066168 A1    8/2002

OTHER PUBLICATIONS

International PCT Search Report, PCT/EP2009/051489, 15 pages, Mailed Sep. 1, 2009.

(Continued)

*Primary Examiner* — Terrell Matthews
(74) *Attorney, Agent, or Firm* — King & Spalding L.L.P.

(57) ABSTRACT

In a device and a method for extracting non-magnetic ores from a pulp comprising non-magnetic ore particles and having a solid fraction of at least 30 mass percent, the pulp flows continuously through a reactor in the direction of flow and magnetic or magnetizable magnet particles that form ore magnetic particle agglomerations with the non-magnetic ore particles are added to said pulp. The ore magnetic particle agglomerations are moved by a magnetic field into an accumulation range of the reactor, and are then discharged out of reactor range and separated into ore and magnetic particles. In a device and a method, the separated magnetic particles are treated, in particular hydrophobized, such that during a new interaction with non-magnetic ore particles, new ore magnetic particle agglomerations are formed. Accordingly, a high yield of ores can be obtained and the mine can be operated in an economical and environmentally friendly manner.

24 Claims, 2 Drawing Sheets

U.S. PATENT DOCUMENTS

| | | | | |
|---|---|---|---|---|
| 3,926,789 A | * | 12/1975 | Shubert | 209/8 |
| 4,455,228 A | | 6/1984 | Jones | 210/222 |
| 4,643,822 A | * | 2/1987 | Parsonage | 209/8 |
| 4,657,666 A | * | 4/1987 | Snook et al. | 209/8 |
| 5,161,694 A | * | 11/1992 | Yoon et al. | 209/5 |
| 5,192,423 A | * | 3/1993 | Duczmal et al. | 209/164 |
| 6,006,920 A | * | 12/1999 | Bilimoria et al. | 209/8 |

OTHER PUBLICATIONS

Ribeiro, J.P., et al., "gaustec—The New Wet High Intensity Separatox", allmineral, presented at Conference on Marketing of Indian Iron Ore in Goa, India; 14 pages, Aug. 2007.

* cited by examiner

US 8,342,336 B2

METHOD AND DEVICE FOR EXTRACTING NON-MAGNETIC ORES

CROSS-REFERENCE TO RELATED APPLICATIONS

This application is a U.S. National Stage Application of International Application No. PCT/EP2009/051489 filed Feb. 10, 2009, which designates the United States of America, and claims priority to EP Application No. 08002788.1 filed Feb. 15, 2008. The contents of which are hereby incorporated by reference in their entirety.

TECHNICAL FIELD

The invention relates to a method for the continuous extraction of non-magnetic ores from a pulp possessing non-magnetic ore particles and having a solid fraction of at least percent by mass, the pulp flowing, in particular continuously flowing, through a reactor in a flow direction, the pulp being supplied with magnetic or magnetizable magnetic particles which with the non-magnetic ore particles form ore/magnetic-particle agglomerates, the ore/magnetic-particle agglomerates being moved by means of a magnetic field into an accumulation region of the reactor, and the ore/magnetic-particle agglomerates being discharged from the accumulation region of the reactor, the ore/magnetic-particle agglomerates being separated into ore particles and magnetic particles.

The invention relates, furthermore, to an apparatus for the continuous extraction of non-magnetic ores from a pulp possessing non-magnetic ore particles and having a solid fraction of at least 30 percent by mass, with a reactor serving for the reception of pulp, the pulp being supplied with magnetic particles which with ore particles form ore/magnetic-particle agglomerates, with means for generating a magnetic field which is configured in such a way that ore/magnetic-particle agglomerates are moved in to at least one accumulation region of the reactor, and with a device for discharging the ore/magnetic-particle agglomerates from the at least one accumulation region to at least one collection region, with a device for separating the ore/magnetic-particle agglomerates into ore particles and magnetic particles.

BACKGROUND

Flotation cells are often used nowadays in order to extract ores from ore-containing bulk material removed during mining. A flotation cell is supplied with an ore-containing pulp, that is to say a suspension consisting of water, of ground rock and of ground ore. All insoluble solids in the pulp form the solid fraction of the pulp which is usually around at least 30% by mass. As a rule, the solid fraction is higher than 30% by mass, in particular around at least 40% by mass, since a flotation cell can be operated appropriately in an efficient way only beyond these solid fractions.

As a result of the addition of appropriate chemicals, the ore particles in the suspension are hydrophobized. A gas, usually air, is injected into the flotation cell. The formation of small bubbles occurs in the pulp. The hydrophobized ore particles adhere to the likewise hydrophobic bubbles and are transported to the surface. A foam having a high ore content is formed there. This foam is removed from the pump via foam run-off gutters and is further processed.

The disadvantage of this solution is that the bubbles which occur are difficult to control. Furthermore, the time until the ore-rich foam passes from the pulp reservoir into the foam run-off gutter is relatively long because of the high viscosity of the pulp. The result of this is that ore particles adhering to the bubbles may be lost again due to interactions of air bubbles with one another. The output of the flotation cell is thereby reduced.

In an alternative variant of ore extraction, non-magnetic ores are extracted from a pulp with the aid of magnetic particles. These usually have a higher output of the ore from the pulp than the conventional flotation method by means of a flotation cell. In this alternative variant, the properties, in particular the surface properties, of magnetic particles are set in such a way that these particles accrete selectively onto the ore to be extracted. By means of a magnetic field, the ore adhering to the magnetic particles can then be removed from the pulp.

Methods of this type are known, for example from U.S. Pat. No. 4,657,666 and U.S. Pat. No. 3,926,789.

The disadvantage of these methods is that large quantities of magnetic particles have to be provided in relation to the quantity of ore to be extracted. This requires a high outlay in logistical terms and may lead to the unprofitability of the plant.

To make the problem even clearer, the following example is given. In a typical mine, as a rule, several 1000 t of bulk material are worked through per hour. The valuable substance, for example ore, has to be withdrawn from this removed bulk material. The bulk material often contains, on average, approximately 1% to 2% of ore to be extracted. Since the ratio of ore and magnetic particles in the extraction of ore by means of magnetic separation is approximately of the same order of magnitude, about 10 t to 100 t of magnetic particles per hour are therefore required, that is to say 240 t to 2400 t per day. This means that the mine requires approximately 10 to 100 truckloads of magnetic particles per day so that the ore extraction process can be maintained. In addition, environmental pollution is caused by the "spent" ore particles. Considerable costs are thereby incurred.

SUMMARY

According to various embodiments, a method and an apparatus can be specified, by means of which a high output in the extraction of ores can be achieved and at the same time the operation of the mine is made more efficient and more environmentally friendly.

According to an embodiment, in a method for the extraction of non-magnetic ores from a pulp possessing non-magnetic ore particles and having a solid fraction of at least 30 percent by mass, the pulp is flowing, in particular continuously flowing, through a reactor in flow direction, the pulp is supplied with magnetic or magnetizable magnetic particles which with the non-magnetic ore particles form ore/magnetic-particle agglomerates, the ore/magnetic-particle agglomerates are being moved by means of a magnetic field into an accumulation region of the reactor, the ore/magnetic-particle agglomerates are being discharged from the accumulation region of the reactor, the ore/magnetic-particle agglomerates are being separated into ore particles or magnetic particles, and the separated magnetic particles are treated, in particular hydrophobized, in such a way that, upon renewed interaction with non-magnetic ore particles, they form anew ore/magnetic-particle agglomerates.

According to a further embodiment, the separated magnetic particles can be removed from an interaction region of the separated ore particles. According to a further embodiment, the ore/magnetic-particle agglomerates can be moved, by means of a plurality of magnetic fields following one another in the flow direction, into accumulation regions of the reactor which are separated from one another. According to a further embodiment, the magnetic particles and/or the ore particles can be hydrophobized. According to a further embodiment, the pulp may flow through the reactor turbulently. According to a further embodiment, the ore/magnetic-particle agglomerates can be discharged continuously into a collection region by means of a magnetic field and/or flow-related measures. According to a further embodiment, the ore/magnetic-particle agglomerates can be discharged into a collection region discontinuously by means of a magnetic field and/or flow-related measures, particularly when a minimum quantity of the accumulated ore/magnetic-particle agglomerates is overshot in the accumulation region. According to a further embodiment, the ore/magnetic-particle agglomerates can be separated into ore particles and magnetic particles by means of chemical, mechanical, acoustic and/or thermal methods. According to a further embodiment, the separation of magnetic particles and ore particles may take place by means of ultrasound. According to a further embodiment, the magnetic particles separated from ore/magnetic-particle agglomerates can be supplied anew to the pulp. According to a further embodiment, the pulp may flow through a plurality of flow ducts separated from one another and, in terms of flow, connected in parallel, wherein the flow ducts in each case being acted upon by at least one magnetic field which moves ore/magnetic-particle agglomerates in the respective flow duct into at least one accumulation region. According to a further embodiment, a state variable for the pulp can be detected, and the supply of magnetic particles and/or, if appropriate, further additives, in particular means for hydrophobizing magnetic particles and/or ore particles, and/or the operation of at least one magnet moving ore/magnetic particles into the accumulation region are/is controlled and/or regulated on the basis of the detected state variable. According to a further embodiment, the pulp can be supplied with magnetic particles before the pulp enters the reactor, in particular during a grinding operation for the grinding of ore.

According to another embodiment, an apparatus for the continuous extraction of non-magnetic ores from a pulp possessing non-magnetic ore particles and having a solid fraction of at least 30 percent by mass, may comprise a reactor serving for the reception of pulp, the pulp being supplied with magnetic particles which with ore particles form ore/magnetic-particle agglomerates, means for generating a magnetic field which is configured in such a way that ore/magnetic-particle agglomerates are moved in to at least one accumulation region of the reactor, a device for discharging the ore/magnetic-particle agglomerates from the at least one accumulation region to at least one collection region, a device for separating the ore/magnetic-particle agglomerates into ore particles and magnetic particles, and a treatment device designed for the treatment of magnetic particles separated from ore/magnetic-particle agglomerates, the separated magnetic particles being capable of being treated thereby in such a way that, upon renewed interaction with non-magnetic ore particles, the separated magnetic particles form anew ore/magnetic-particle agglomerates.

According to a further embodiment of the apparatus, the reactor can be designed in such a way that a definable pulp volume flow, preferably at least 7000 cubic meters per hour, in particular 10 000 cubic meters per hour to 15 000 cubic meters per hour, can flow through it. According to a further embodiment of the apparatus, the reactor can be connected fluidically to the at least one collection region. According to a further embodiment of the apparatus, the separation device may have ultrasonic transmitters for emission of ultrasound, the emission power of which can be set in such a way that ore/magnetic-particle agglomerates can be separated into magnetic particles and ore particles. According to a further embodiment of the apparatus, the discharge device may have means for generating a magnetic field, which is designed in such a way that the ore/magnetic-particle agglomerates are discharged, guided magnetically, out of the at least one accumulation region. According to a further embodiment of the apparatus, the reactor may comprise a plurality of flow ducts separated from one another and, in flow terms, connected in parallel. According to a further embodiment of the apparatus, the number and/or configuration of the plurality of flow ducts can be determined in such a way that the following equation is fulfilled:

$$\dot{V}_{mindes} \leq \sum_{i=1}^{n} \dot{V}_i,$$

in which $\dot{V}_{min\ des}$ is the minimum desired volume flow through the apparatus, and $\dot{V}_i$ is the volume flow through the i-th flow duct, i being a whole number. According to a further embodiment of the apparatus, during operation, essentially the same volume flow may flow through the plurality of flow ducts, and the number of flow ducts is determined according to:

$$\frac{\dot{V}_{mindes}}{\dot{V}_i} \leq n$$

in which $\dot{V}_{min\ des}$ is the minimum desired volume flow through the apparatus, and $\dot{V}_i$ is the same volume flow through all the i flow ducts which the flow passes, n, i being whole numbers. According to a further embodiment of the apparatus, the plurality of flow ducts in each case may have means for generating a magnetic field moving ore/magnetic-particle agglomerates into the at least one accumulation region to which the respective flow duct relates. According to a further embodiment of the apparatus, at least one flow duct of the plurality of flow ducts may have a closing element for opening and closing the at least one flow duct, so that, in the closed state of the closing elements assigned to the at least one flow duct, the pulp cannot flow through the at least one flow duct. According to a further embodiment of the apparatus, the apparatus may comprise a device for the production of magnetic particles which, upon contact with ore particles, form ore/magnetic-particle agglomerates.

BRIEF DESCRIPTION OF THE DRAWINGS

Further advantages are gathered from an exemplary embodiment which is explained in more detail by means of the following diagrammatic figures in which.

DETAILED DESCRIPTION

According to various embodiments, in a method of the type initially mentioned, the separated magnetic particles are treated, in particular hydrophobized, in such a way that, upon renewed interaction with non-magnetic ore particles, they form anew ore/magnetic-particle agglomerates.

This method allows the reutilization of magnetic particles. Consequently, the outlay for the provision and supply of new quantities of magnetic particles to the plant can be reduced considerably.

The magnetic particles may be supplied to the pulp even before the pulp enters the reactor. The magnetic particles used may be, for example, magnetite. However, any other magnetic or magnetizable magnetic particles or media/substances may also be employed.

The magnetic particles supplied to the pulp preferably have a surface, onto which non-magnetic ore particles can selectively accrete. The provision of such a surface may take place by means of a pretreatment, in particular chemical pretreatment, of the magnetic particles. Magnetic particles and ore particles bound to them are designated, in the context of this application, as an ore/magnetic-particle agglomerate.

By ore/magnetic-particle agglomerates being formed, the non-magnetic ore can be moved in a directed manner in the pulp by means of a magnetic field to a predetermined location or into a predetermined region, since a force acts upon the magnetic particles carrying the ore particles.

The magnetic field is in this case formed in such a way that the ore/magnetic-particle agglomerates collect in a predetermined accumulation region. The accumulation region is at least one specific volume element of the reactor, into which or through which volume element ore/magnetic-particle agglomerates are moved in a directed manner by means of a magnetic field.

The ore/magnetic-particle agglomerates are then removed from the accumulation region and consequently from the main stream of the pulp. A reactor is understood to mean an apparatus portion or the sum of those apparatus portions in which an accumulation of ore/magnetic-particle agglomerates takes place with the aid of at least one magnetic field. The main stream is a pulp stream which bases the accumulation region and from which ore/magnetic-particle agglomerates can be removed.

The ore/magnetic-particle agglomerates are subsequently separated. The separation products, that is to say ore particles and magnetic particles, are designated as separate ore particles and separate magnetic particles. For the present method, a careful separation of the ore/magnetic-particle agglomerates into ore particles and magnetic particles is especially advantageous, since in careful separation, as a rule, the properties of the magnetic particles are not influenced too greatly in an undesirable way by the separation process.

The method preferably takes place continuously, since, under these circumstances, a continuous extraction of ore is possible.

The method according to various embodiments has the great advantage that the plant has to be supplied with a considerably reduced quantity of magnetic particles, for example magnetite, in order to achieve the same throughput and the same output in ore extraction in the mine. The various embodiments make it possible to reutilize, that is to say recycle, even magnetic particles used in ore extraction, in particular in terms of their original function. The demand for magnetic particles which are to be supplied anew to the plant, that is to say are to be transported anew to the mine, is therefore greatly reduced, for example by at least approximately one order of magnitude. This lowers both the transport costs and the purchase costs for the magnetic particles. Also, as a result, natural resources are protected and the logistical problems of the mine are reduced considerably. This leads to an increased efficiency of the mine. The environment benefits both from the protection of resources and from the reduced outlay in logistical terms, the theme of environmental protection increasingly being environmental regulations which are laid down for mine operators and adherence to which likewise incurs costs.

These advantages are achieved in that, after the separation and splitting of the ore/magnetic-particle agglomerates into ore particles and magnetic particles, the magnetic particles are treated in such a way that they can be used anew for ore extraction, in particular for the formation of ore/magnetic-particle agglomerates. Treatment may take place chemically, thermally, mechanically or otherwise.

The treatment required is usually dependent on the preceding separation step. If the separation of the agglomerates takes place in such a way that the properties of the magnetic particles, in particular chemical surface properties or dimensions of the magnetic particles, brought about, as a rule, by corresponding method steps, that is to say, for example, hydrophobization, are undesirably influenced to only a slight extent by the ore extraction process, in particular the agglomeration process or separation process, the intensity of the treatment of the magnetic particles may be lower than if the desired and set properties of the magnetic particles are undesirably changed completely by the processes undergone by the magnetic particle.

Ideally, no treatment of the magnetic particles used has to take place after the separation of the ore/magnetic-particle agglomerates. In this case, the previously set property of the magnetic particles is still present to the full extent and is also to be maintained thus. In this case, the treatment of the magnetic particles is a non-treatment of the magnetic particles, since the magnetic particles still have the required properties.

In practice, however, this is somewhat unlikely on account of the interaction processes in the pulp, for example friction, shocks, secondary chemical processes, etc.

As a rule, always at least a certain minimum fraction of magnetic particles has to be treated in order to keep the ore extraction process at a high output.

All possibilities of setting the desired properties of the individual magnetic particles after separation are available to a person skilled in the art according to various embodiments.

Thus, for example, an originally set hydrophobic surface property of the magnetic particles can be restored by means of "re"-hydrophobization.

Alternatively, however, properties of the separated magnetic particles may also be varied in a directed manner in the treatment step, in order to influence the following ore extraction process involving these magnetic particles in a directed manner.

Also, the treatment of the magnetic particles is to be understood as meaning also the setting of the properties of the sum of magnetic particles, for example the setting of a desired grain size distribution of the separated magnetic particles or the like.

According to a further embodiment, the separated magnetic particles are removed from an interaction region of the separated ore particles. As a result, a treatment of the separated magnetic particles becomes especially simple, since the separated ore particles do not cause a disturbance during the treatment of the magnetic particles. Moreover, the separated ore extracted can be further processed soon after the separation of the ore/magnetic-particle agglomerates.

According to a further embodiment, the ore/magnetic-particle agglomerates are moved, by means of a plurality of magnetic fields following one another in the flow direction, into accumulation regions of the reactor which are separated from one another. The output can thereby be increased further. On account of the high viscosity of the pulp, as a rule, not all the ore/magnetic-particle agglomerates pass into the accumulation region which is first in the flow direction. Owing to the use of a plurality of extraction regions or separation regions following one another in the flow direction, that is to say regions in which a force caused by a magnetic field moves ore/magnetic-particle agglomerates in the direction of a predetermined accumulation region, the extraction rate for ore/magnetic-particle agglomerates from the pulp is further increased.

According to a further embodiment, the magnetic particles and/or the ore particles are hydrophobized. The chemicals which can be used for a hydrophobization of substances are known to a person skilled in the art. What can be achieved by hydrophobizing magnetic particles and/or ore particles is that magnetic particles and ore particles bind with one another. In this embodiment, this binding is the basis for an ore/magnetic-particle agglomerate. However, other binding mechanisms may also be used, which generate an ore/magnetic-particle agglomerate from the ore particles and magnetic particles present in the pulp.

According to a further embodiment, the pulp flows through the reactor turbulently. A turbulent flow may be established, for example, via the flow velocity or via a corresponding design of the reactor. In contrast to a laminar flow, a turbulent flow of the pulp has the advantage that magnetic field-free spaces, which occur, for example, on account of the magnetic arrangement, in the extraction and separation region are of scarcely any importance. The turbulent flow makes it possible, for example, to select magnetic field arrangements in which the force upon an ore/magnetic-particle agglomerate is, on average, at maximum, but, for example because of a magnetic arrangement, force field-free spaces should also exist.

According to a further embodiment, the ore/magnetic-particle agglomerates are discharged continuously into a collection region by means of a magnetic field and/or flow-related measures. Uniform operation is thereby achieved Such a procedure is expedient when a high density of ore/magnetic-particle agglomerates constantly prevails in the accumulation region. A specific collection region may be provided for each accumulation region. Preferably, a plurality of accumulation regions are assigned to one collection region.

According to a further embodiment, the ore/magnetic-particle agglomerates are discharged into a collection region discontinuously by means of a magnetic field and/or flow-related measures, particularly when a minimum quantity of the accumulated ore/magnetic-particle agglomerates is overshot in the accumulation region. As a result of a discontinuous discharge, a continuous extraction of ores is possible, but the ore/magnetic-particle agglomerates accumulated in a specific accumulation region are in each case supplied intermittently to a collection region. Preferably, discharge from the respective accumulation region is then carried out as soon as a definable minimum quantity of ore/magnetic-particle agglomerates is present in the respective accumulation region. For various accumulation regions, particularly accumulation regions following one another in the flow direction, different minimum quantities may be provided as a threshold value for initiating a discharge from the respective accumulation region. A specific collection region may be provided for each accumulation region. Preferably, a plurality of accumulation regions are assigned to one collection region.

According to a further embodiment, ore/magnetic-particle agglomerates are separated into ore particles and magnetic particles by means of chemical, mechanical, acoustic and/or thermal methods. This, on the one hand, makes the subsequent processing of the ore easier, since apparatuses capable of being used hitherto for further processing can be maintained essentially unchanged. The separation mechanism for the ore/magnetic-particle agglomerates is, as a rule, dependent on the selected binding mechanism for the ore/magnetic-particle agglomerates.

According to a further embodiment, the separation of magnetic particles and ore particles takes place by means of ultrasound. Ultrasound is especially suitable for the separation of ore/magnetic-particle agglomerates into ore particles and magnetic particles, since, by means of this, a bond between the ore particles and magnetic particles can be broken independently of the selected binding mechanism.

According to a further embodiment, the pulp is supplied anew with the magnetic particles separated from the ore/magnetic-particle agglomerates and treated. The magnetic particles are in this case supplied to the pulp in such a way that they form anew ore/magnetic-particle agglomerates, and in such a way that these ore/magnetic-particle agglomerates formed pass into at least one magnetic field moving the ore/magnetic-particle agglomerates into an accumulation region. This reutilization leads to a drastic reduction in the costs for the plant operator. The aim, therefore, is to have as high a recycling rate or reutilization rate as possible for the magnetic particles.

In particular, it is advantageous that magnetic particles are produced on the spot in the mine. As a result, there can be a flexible reaction to the demand for new magnetic particles and to efficient operation capacity utilization. Since, as a rule, not all the magnetic particles supplied to the pulp are retained, in particular retained in working order, during the separation of the ore/magnetic-particle agglomerates, it is necessary, as a rule, always to use a fraction of new magnetic particles for the method according to various embodiments. These new magnetic particles can be provided especially flexibly and simply via a production plant installed on the spot. In particular, it is advantageous to arrange the production plant and the treatment device so as to be spatially adjacent to one another, while magnetic particles are exchangeable between the production plant and treatment device or these are to be combined in structural terms.

According to a further embodiment, the pulp flows through a plurality of flow ducts separated from one another and, in terms of flow, connected in parallel, the flow ducts in each case being acted upon by a magnetic field which moves ore/magnetic-particle agglomerates in the respective flow duct into at least one accumulation region. As a result of such a procedure, it is possible to increase the throughput of a plant, as desired, utilizing a uniform concept. In order to increase the throughput of the present method, it is merely necessary to increase the inlet-side pulp volume flow and also to provide a number of further flow ducts through which the pulp flows and in which accumulation can take place in accumulation regions which are provided for this purpose and from which ore/magnetic-particle agglomerates can be discharged.

According to a further embodiment, a state variable of the pulp is detected and the supply of magnetic particles and/or, if appropriate, further additives, in particular means for hydrophobizing the magnetic particles and/or ore particles, and/or the operation of at least one magnet are/is controlled and/or regulated on the basis of the detected state variable. The state variable used may be, in particular, a variable which has a significant influence upon ore extraction. For example, the state variable adopted may be an ore fraction in the pulp or ore fractions of different ores in the pulp, a size distribution of ore particles, a measure of saturation for the formation of ore/magnetic-particle agglomerates, or a measure of the hydrophobization of the ore particles and/or magnetic particles present in the pulp. Since the addition of magnetic particles and/or of further additives in the required quantities or the operation of at least one magnet for deflecting ore/magnetic particles into the accumulation region is controlled and/or regulated accurately, resources, such as, for example, magnetic particles and, if appropriate, further additives, such as, for example, chemicals for hydrophobizing ore particles and/or magnetic particles, can be used, especially sparingly.

As a result, costs for carrying out the method and also environmental pollution are kept as low as possible. Furthermore, however, exactly that quantity of magnetic particles and/or additives which sets as high a fraction of the ore particles as possible in the pulp and ore/magnetic-particle agglomerates can also be administered to the pulp. This is important, since the quantity of ore/magnetic-particle agglomerates present in the pulp has an appreciable influence upon the ore output from the pulp.

According to a further embodiment, the pulp is supplied with magnetic particles before the pulp enters the reactor, in particular during or before a grinding operation for the grinding of ore. Admittedly, in a reactor, there is preferably a turbulent flow which ensures that ore particles and magnetic particles bind to one another and thereby form ore/magnetic-particle agglomerates. It is advantageous, however, to introduce as high a mixing energy as possible into the pulp, in order to bring ore particles and magnetic particles into contact with one another, so that these can make a bond. This takes place preferably before the pulp is introduced into the reactor, since especially intensive and energy-rich intermixing can take place here.

In particular, it is advantageous to combine the operation of mixing the ore particles and magnetic particles with the operation of grinding the ore in order to produce ore particles. A combinational effect thereby becomes effective. On the one hand, the mill grinds the ore to a desired particle size and, on the other hand, the mill at the same time introduces a high mixing energy into the pulp. The energy-rich mixing of magnetic particles and ore particles thus results in an improved ore/magnetic-particle agglomerate formation, thus leading in the reactor to an increase in the ore output. If appropriate, additional mixing, in addition to the turbulent flow, present if appropriate, may be carried out before or upon entry into the reactor.

According to other embodiments, an apparatus of the type initially mentioned, comprises a treatment device designed for the treatment of magnetic particles separated from ore/magnetic-particle agglomerates, the separated magnetic particles being capable of being treated thereby in such a way that, upon renewed interaction with non-magnetic ore particles, the separated magnetic particles form anew ore/magnetic-particle agglomerates.

The magnetic particles supplied to the pulp may be supplied in the apparatus itself or be introduced into the pulp as early as in a preceding process, for example during the grinding of the ore. If a supply of magnetic particles into the pulp is to take place in the apparatus, the apparatus preferably has a supply device for supplying magnetic particles to the pulp. The advantage of this is that the quantity of magnetic particles to be added, for example in order to obtain as high a fraction of ore particles as possible in the pulp as ore/magnetic-particle agglomerates, can be set very easily.

It is essential for the functioning of the apparatus according to various embodiments that, when the pulp enters a magnetic field which is provided for the separation of ore/magnetic-particle agglomerates from the pulp and is generated by corresponding means, ore/magnetic-particle agglomerates which can be moved into an accumulation region by means of a magnetic field are present in the pulp. These are then discharged from the accumulation region into a collection region by means of a discharge device.

According to a further embodiment, the reactor is designed in such a way that a definable pulp volume flow, preferably at least 7000 cubic meters per hour, in particular 10 000 cubic meters per hour to 15 000 cubic meters per hour, can flow through it.

An apparatus of this type can thereby be operated with a high throughput and at the same time with a relatively high output. This constitutes an essential economic factor for operating an apparatus of this type.

By the ore/magnetic-particle agglomerates being separated into ore particles and magnetic particles, it becomes possible, by means of a treatment device, to treat the magnetic particles in such a way that they can be used further for ore extraction in the way described. This gives rise to the above-mentioned advantages for the operator and for the environment.

According to a further embodiment, the reactor is connected fluidically to the at least one collection region. As a result, the discharge from the accumulation region can be implemented especially simply, since the hydrostatic pressure assists the discharge of the ore/magnetic-particle agglomerates accumulated in the accumulation region. A fluidic connection of the collection region to the accumulation region of the reactor is especially advantageous in the case of a continuous discharge of ore/magnetic-particle agglomerates from the accumulation region.

It is likewise advantageous if at least one separation device with ultrasonic transmitters for the emission of ultrasound is provided, the emittable power of which can be set in such a way that ore/magnetic-particle agglomerates can be separated into magnetic particles and ore particles. As a result, a separation of the ore/magnetic-particle agglomerates into ore particles and magnetic particles can thereby be assisted or take place efficiently in a particularly simple manner. As a result of the separation of the ore/magnetic-particle agglomerates in one of the next process steps after discharge from the accumulation region, it is possible to supply the recovered magnetic particles anew to the pulp. A recycling of the magnetic particles thus takes place at least partially. Furthermore, there is no need for any process changes for the subsequent processes involving the further processing of the ore, since the ore particles can be further processed, as hitherto, as ore particles, and not in the form of ore/magnetic-particle agglomerates.

According to a further embodiment, the reactor comprises a plurality of flow ducts separated from one another and, in flow terms, connected in parallel. The plurality of flow ducts makes it possible to use the basic principle for accumulating the ore for a throughput of any desired amount. Particularly when structurally identical tubes and means for generation of magnetic fields are always used for essentially all the flow ducts, the reactor can be standardized to a great extent. That is to say, the same components are required repeatedly for the flow ducts and for their operation. This leads to a reduction in cost for the apparatus. Furthermore, replacement parts can be obtained more easily for maintenance work or are always in stock.

In particular, it is advantageous to configure the reactor in such a way that it can be supplemented or extended by additional flow ducts for the accumulation of ore/magnetic-particle agglomerates. If, for example, it is necessary to increase the throughput of a reactor, a corresponding number of flow ducts can simply be connected fluidically to the reactor, for example by being flanged on. As a result, for example, the throughput of the apparatus can be increased or the failure of part of the apparatus compensated. Such an extension of the reactor may take place, where appropriate, when the apparatus is operating at full capacity. The flexibility of the ore extraction apparatus is thereby increased.

It is especially advantageous that the number and/or configuration of the plurality of flow ducts are/is determined in such a way that the following equation is fulfilled:

$$\dot{V}_{mindes} \leq \sum_{i=1}^{n} \dot{V}_i$$

in which $\dot{V}_{min\ des}$ is the minimum desired volume flow through the apparatus, and $\dot{V}_i$ is the volume flow through the i-th flow duct, i being a whole number.

Volume flow is understood to mean the pulp volume flowing per unit time through a reference volume of the reactor. In this case, it is possible to design the flow ducts at least partially differently, so that the part volume flow $\dot{V}_i$ for the i flow ducts is different at least for individual flow ducts. As a function of the part volume flows $\dot{V}_i$ provided in each case, the number of flow ducts for the apparatus is then obtained, since the sum of the part volume flows $\dot{V}_i$ should reach or overshoot a predetermined minimum desired volume flow $\dot{V}_{min\ des}$.

Preferably, the desired minimum volume flow for the coarse separation or coarse extraction of ore-particle/magnetic-particle agglomerates amounts to at least 7000 cubic meters per hour ($m^3/h$), preferably 10 000 $m^3/h$ to 15 000 $m^3/h$. In this range of order of magnitudes, an apparatus for the coarse extraction of ores from a pulp flowing for the first time into a reactor begins to operate efficiency.

For a further upgrading of ore by means of streams already enriched with ore, a desired minimum volume flow of at least 2 $m^3/h$, preferably 5 $m^3/h$ to 10 $m^3/h$, is preferably set. Ore-enriched streams of this type are likewise considered in the context of this application as pulp.

Preferably, the process of the coarse extraction of ore from a pulp and the process of upgrading ore by means of streams already enriched with ore are provided in succession.

According to a further embodiment, during operation, essentially the same volume flow flows through the plurality of flow ducts, and the number of flow ducts is determined according to:

$$\frac{\dot{V}_{mindes}}{\dot{V}_i} \leq n$$

in which $\dot{V}_{min\ des}$ is the minimum desired volume flow through the apparatus, and $\dot{V}_i$ is the volume flow through the i-th flow duct, i being a whole number. In this case, all $\dot{V}_i$ are essentially identical. Such a design of the apparatus complies to the abovementioned advantages. In particular, the required number of flow ducts necessary for providing a specific volume throughput can thus be determined in a simple way.

Furthermore, it is advantageous that the plurality of flow ducts in each case have means for generating a magnetic field moving ore/magnetic-particle agglomerates into the at least one accumulation region to which the respective flow duct relates. This is necessary so that the flow ducts can be used for the accumulation of ore/magnetic-particle agglomerates. Only thereby does an actual increase in throughput with a substantial ore output take place.

According to a further embodiment, at least one flow duct of the plurality of flow ducts has a closing element for opening and closing the at least one flow duct, so that, in the closed state of the closing element assigned to the at least one flow duct, the pulp cannot flow through the at least one flow duct. As a result, it is possible, for example, to cut in or cut out flow ducts in the reactor, as required, preferably by means of a control device. In particular, valves make it possible to extend the apparatus by means of flow ducts when the apparatus is operating fully. A requirement may arise, for example, in the event of a defect of a flow duct operated hitherto or in the event of a maintenance measure for an operated flow duct. If appropriate a requirement can also lie in expanding the ore extraction, that is to say in an increasing throughput of the pulp, which cannot be dealt with by the flow ducts which are in operation. The flow ducts affected, for example, by a maintenance measure are then closed by means of a closing device, for example a valve, while ore extraction is continued, using further flow ducts hitherto closed and then opened flow ducts.

Preferably, at least one flow duct can be closed by means of a closing element in such a way that the closing element, in the closed state, does not impede the pulp stream through the flow ducts in each case.

Preferably, individual flow ducts can be removed from the rest of the reactor. This makes it possible to have a rapid exchange of a flow duct or of the means for generating a magnetic field, without the throughput of the apparatus being restricted too greatly.

According to a further embodiment, the apparatus comprises a device for the production of magnetic particles which, upon contact with ore particles, form ore/magnetic-particle agglomerates. There can thereby be a flexible reaction to the consumption of magnetic particles. Corresponding planning for the production of the magnetic particles can take place as a function of full capacity utilization, in particular of the planned pulp throughput of the reactor.

Figure 1:
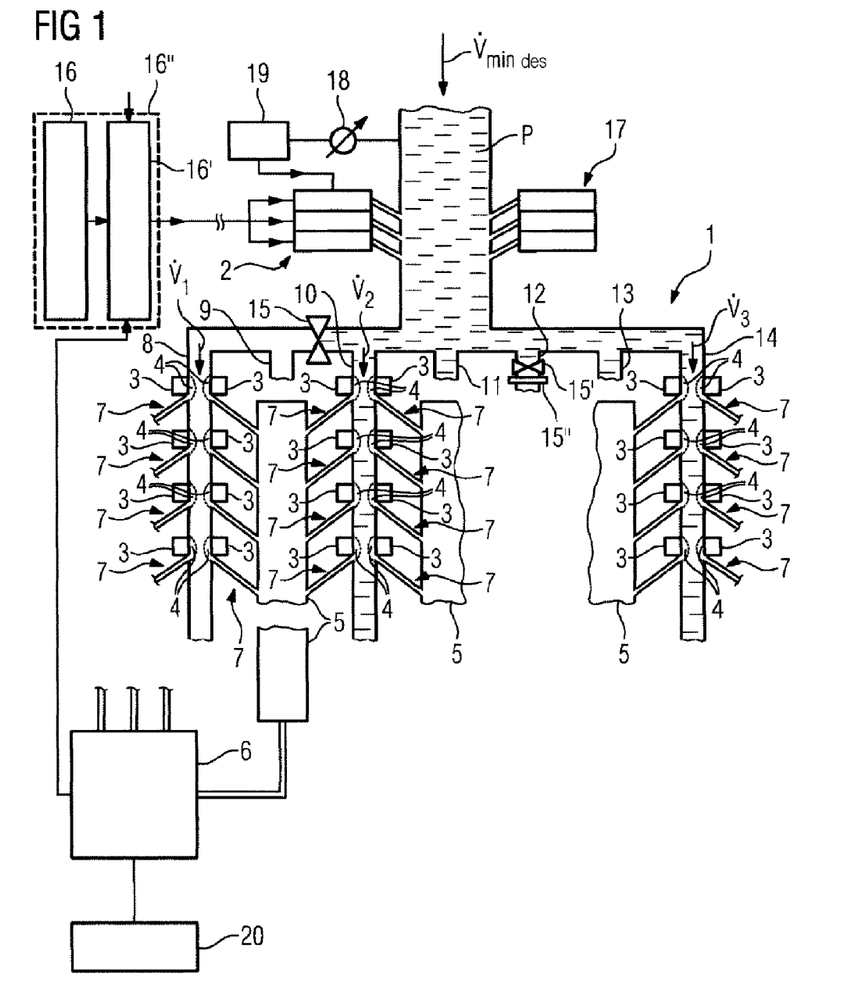
FIG. 1 shows a diagrammatic illustration of an apparatus for the extraction of non non-magnetic ores from a pulp containing non-magnetic ore particles.

The apparatus, illustrated diagrammatically in FIG. 1, for ore extraction comprises a reactor 1, through which a pulp P flows. The pulp P has a solid fraction of 30 to 60 percent by mass and is therefore to a high extent abrasive. The solid in the pulp is composed essentially of gangue, that is to say dead rock, and of the ore. The pulp P is supplied to the reactor 1 at a flow velocity, so that a desired minimum pulp volume flow $\dot{V}_{min\ des}$ through the reactor 1 is achieved. In the present exemplary embodiment, the desired minimum pulp volume flow $\dot{V}_{min\ des}$ amounts to 135 $m^3$ per minute.

The pulp P entering the reactor 1 already has ore/magnetic-particle agglomerates, since the supply of magnetic particles and of hydrophobizing agents has already taken place in an ore mill for the grinding of ore. A high mixing energy is thereby introduced into the pulp P, thus contributing to an improved formation of ore/magnetic-particle agglomerates. Alternatively or additionally, addition of magnetic particles and hydrophobizing agents into the pulp P may take place between the mill and apparatus or in the apparatus.

In the present exemplary embodiment, sulfidic ores, in particular copper sulfide or molybdenum sulfide, form the non-magnetic ore to be extracted. The method or the apparatus may be used for a multiplicity of non-magnetic ores, in particular for sulfidic ores, and also, when suitable hydrophobizing chemistry is employed, for oxidic and other ores.

For the pulp P flowing into the reactor 1, a state variable for the pulp P, in particular a state variable of the pulp P influenced by the ore particles, is detected by means of a measurement device 18. In the present case, the state variable used is an average fraction for ore particles in the pulp P which are not yet bound to magnetic particles. However, a person skilled in the art may also select any other state variable or combination of state variables for the pulp P with an influence on ore extraction, for example the overall fraction of magnetic particles in the pulp, independently of its state of bonding to the ore.

By means of this detected state variable, a control device 19 controls the additional addition of magnetic particles into the pulp P already acted upon by magnetic particles.

Furthermore, for example, the intensity of the magnetic field, in particular the coil current when electromagnets are used, is controlled and/or regulated by means of the detected state variable.

The measurement of the state variable in this case preferably takes place upstream of the reactor 1 in the flow direction. Thus, the reactor 1, in particular the magnets which the latter possesses, can be controlled or regulated in such a way that the operation of the reactor 1 and therefore of the entire apparatus is optimized.

If different ores are present in the pulp, different magnetic particles, which differ from one another, for example, in the form of their selective surface conditioned for a specific ore, may also be supplied to the pulp P by means of a supply device 2.

Furthermore, if required, where appropriate, under the control of the control device 19, further additives may also be introduced into the pulp P by means of the same or a further supply device 17.

Subsequently, in the present exemplary embodiment, the pulp stream is conducted into a plurality of flow ducts 10, 11, 12, 13 and 14. The number of flow ducts 10, 11, 12, 13 and 14 is selected in such a way that by means of these, in sum, the desired minimum pulp volume flow $\dot{V}_{min\ des}$ is achieved.

Furthermore, two further flow ducts 8 and 9 are provided, which can be cut in, as required, by the opening of a valve 15 for ore extraction. On account of the abrasive medium which flows through the reactor, regular maintenance work must be expected. By the provision of further flow ducts which can be opened during maintenance work, the plant can maintain its throughput. In spite of the maintenance work, there are no losses in efficiency due to stoppage times.

Furthermore, at least one flow duct 10, 11, 12, 13 and 14 can be closed by means of a valve 15' in such a way that the flow of the pulp P through the further flow ducts 10, 11, 12, 13 and 14 is not impeded. In the exemplary embodiment, the flow duct 12 has a valve 15' of this type. By means of this valve 15', the flow duct 12 can be shut off or closed, without the functioning of the other flow ducts being impaired. At any desired time point, the valve 15' can be opened again, so that pulp P flows through the flow duct 12 again. This is especially advantageous for maintenance work on the flow duct 12.

Preferably, all the flow ducts 8, 9, 10, 11, 12, 13 and 14 have a valve 15' of this type. Furthermore, the flow duct 12 has a releasable fastening device 15" which follows the valve 15' in the flow direction and by means of which the flow duct can be fastened removably to the rest of the reactor 1. Preferably, all the flow ducts have a fastening device 15" of this type.

A fastening device 15" of this type is especially advantageous since, for example, repair measures do not have to be carried out on the spot, but, instead, the affected flow duct, for example the flow duct 12, can be transported into a workshop, while the rest of the apparatus continues to operate. In particular, a flow duct of this type can be replaced particularly simply, for example because of a longer-lasting repair for a defective flow duct, by another flow duct during the operation of the apparatus, in that the latter flow duct is installed in the reactor 1 in place of the demounted flow duct. After installation, the valve 15' assigned to this flow duct is opened, and the then installed flow duct contributes to ore extraction. Losses of throughput are thereby avoided. Nor do any stoppage times of the apparatus arise.

An especially simple replacement of a flow duct 8, 9, 10, 11, 12, 13 and 14 suitable for ore extraction is possible when means 3 for generating a magnetic field are arranged fixedly in relation to the flow duct 8, 9, 10, 11, 12, 13 and 14 and consequently can be mounted and demounted together with the flow duct. A functional module is thereby obtained, which merely has to be connected to the reactor 1 and to a discharge device 7.

Furthermore, in the present exemplary embodiment, all the flow ducts 8, 9, 10, 11, 12, 13 and 14 are essentially identical in structural terms. That is to say, for example, when the flow ducts 10, 11, 12, 13 and 14 are in operation, these, as a rule, also have the same volume flows.

In each case a plurality of means 3 for generating magnetic fields are provided in succession in the flow direction on the flow ducts 8, 9, 10, 11, 12, 13 and 14. The magnetic fields generated by the means 3 move the ore/magnetic-particle agglomerates contained in the pulp P into the respective accumulation regions 4 in the flow ducts 10, 11, 12, 13 and 14, insofar as pulp P flows through a flow duct 8, 9, 10, 11, 12, 13 and 14.

Depending on the type of operation of the apparatus, the ore/magnetic-particle agglomerates accumulate inside the accumulation region 4 of the reactor 1 and are then routed discontinuously, preferably under the guidance of a magnetic field generated by separate means, not illustrated in FIG. 1, provided for this purpose, into a collection region 5.

Preferably, the ore/magnetic-particle agglomerates are discharged into a plurality of collection regions 5. In particular, in the exemplary embodiment, there is provision for adjacent flow ducts, such as, for example, the flow ducts 12, 13 and 14, to empty their accumulation regions 4 into a common collection region 5.

In the collection region 5 and/or in the separate separation device 6, the ore/magnetic-particle agglomerates are separated into ore particles and magnetic particles. With regard to the reutilization of the separated magnetic particles, it is especially advantageous to employ a separation method which does not change the set and desired properties of the magnetic particles.

One possibility for separating the ore/magnetic-particle agglomerates is afforded by the use of high-power ultrasound in order to break up the surface bond of the ore particles and the magnetic particles. The ultrasound is radiated by means of an ultrasonic transmitter of correspondingly high power into the collection region 5 or into the separation device 6. The advantage of using ultrasound is that bonds of ore and magnetic particles can be broken open independently of their binding mechanism.

However, further, more careful methods may also be used in order to separate the ore/magnetic-particle agglomerates into ore particles and magnetic particles.

In particular, the use of nonpolar suspension agents, into which the ore/magnetic particles are administered, has proved to be especially careful for the separation of ore/magnetic-particle agglomerates into ore particles and magnetic particles.

What can be achieved by the separation, carried out in the exemplary embodiment in the separation device 6, of the ore/magnetic-particle agglomerates into ore particles and magnetic particles is that magnetic particles can be reutilized and, if appropriate, can be supplied again to the supply device 2. Furthermore, the ore particles obtained from the separation can be further processed essentially in the conventional way in a further-processing device 20.

The separated magnetic particles are routed on the separation device 6 to a treatment device 16'. There, if appropriate, the magnetic particles are analyzed and treated in such a way that, when supplied anew to the pulp P, they form anew ore/magnetic-particle agglomerates.

The treatment step is necessary in order, even for the reutilized magnetic particles, to achieve an appropriately high bonding action to the ore to be extracted from the pulp P. If the treatment step were absent, a higher concentration of magnetic particles in the pulp would be necessary in order to achieve the same ore output from the pulp P. However, under this condition, the mass fraction of magnetic particles in the mass fraction of pulp would rise, this, in turn, having an adverse effect on the throughput of ore through the apparatus or reactor 1, insofar as the hydrodynamic properties in the reactor 1 are to remain essentially unchanged.

Furthermore, the apparatus comprises a device 16 for the production of magnetic particles, preferably with a grain size lower than 5 micrometers, the magnetic particles forming, upon contact with ore particles, ore/magnetic-particle agglomerates.

Although a separation of ore particles from magnetic particles can be achieved by means of the separation device 6, it is, where appropriate, not expedient to supply all the magnetic particles anew to the pulp P, for example by means of the supply device 2. In particular, on account of the separation process, degenerative phenomena on the surface or a reduction in the grain size of the magnetic particles may occur, thus causing the output of ore from the pulp to fall when magnetic particles of this type are used.

Furthermore, it is difficult in practice, during the separation of ore/magnetic-particle agglomerates into ore particles and magnetic particles, to recover 100 percent of the magnetic particles. Preferably, therefore, a certain fraction of magnetic particles is continuously introduced anew into the apparatus, in order to replace the loss of magnetic particles during the separation step.

There is therefore, as a rule, the need always to keep newly conditioned magnetic particles in reserve, in order to replace "spent" magnetic particles.

For this purpose, a corresponding device 16 for the production of magnetic particles is especially advantageous. A device of this type is preferably used in order to produce magnetic particles with grain sizes lower than 5 μm, since these can be produced efficiently. For magnetic particles larger than 5 μm, preferably natural magnetite, ground if appropriate, is used, which can be supplied preferably directly to the treatment device 16'. This is indicated in FIG. 1 by an arrow in the direction of the treatment device 16'.

The magnetic particles newly introduced into the apparatus are then treated in the treatment device 16' in such a way that the desired properties of the magnetic particles are established. In particular, the properties of the magnetic particles newly introduced into the apparatus are set in such a way that they bind to the ore present in the pulp and form ore/magnetic-particle agglomerates.

In particular, it is advantageous if the supply device is connected directly to the treatment device 16' and, if appropriate, to the device 16 for the production of magnetic particles.

It is advantageous to combine the production device 16 and treatment device 16' structurally. This is indicated in FIG. 1 by the dashed line surrounding the illustrated production device 16 and treatment device 16'. Then, by means of this combined device 16", newly produced and also separated magnetic particles can be newly reconditioned, so that they can be used again for the formation of ore/magnetic-particle agglomerates. This saves space and, if appropriate, costs due to an integrated solution, since newly produced magnetic particles, as a rule, also require treatment which allows the formation of ore/magnetic-particle agglomerates.

Figure 2:
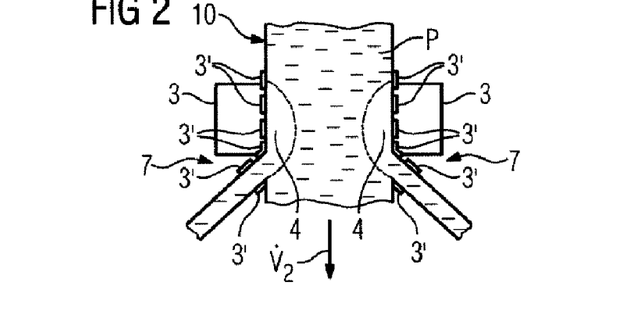
FIG. 2 shows a diagrammatic illustration of a separation region of a reactor.

FIG. 2 shows a detail of a flow duct, for example of the flow duct 10. Means 3 for generating a magnetic field are arranged in the vicinity of or on the flow duct, the means 3 being designed in such a way that the magnetic field moves ore/magnetic-particle agglomerates into an accumulation region 4 of the flow duct 10. In addition to the means 3 for generating a magnetic field for the movement of ore/magnetic-particle agglomerates into an accumulation region 4, means 3' for generating a magnetic field for the magnetic discharge of the ore/magnetic-particle agglomerates out of the accumulation region 4 are present. The discharge device 7, comprising the means 3' and a fluid guide, not designated in any more detail, is connected fluidically to the reactor 1, in particular the flow duct, and to a collection region, not illustrated in FIG. 2.

The means 3' of the discharge device are designed in such a way that they exert a force upon the ore/magnetic-particle agglomerates present in the accumulation region 4 which guides these in a directed manner into the fluid guide extending from the reactor 1 or the respective flow duct 8, 9, 10, 11, 12, 13 and 14 to the collection region 5. Discharge into the fluid guide may, if appropriate, be assisted additionally by a vacuum in the fluid guide. If appropriate, the fluid guide may have means for closing the fluid guide. The fluid guide is opened with the aid of the means for closing the fluid guide only when a minimum quantity of ore/magnetic-particle agglomerates is present in the accumulation region 4. Furthermore, the opening of the fluid guide takes place in coordination with the means 3' which exert the force upon the ore/magnetic-particle agglomerates. What is achieved thereby is that pulp does not flow permanently through the fluid guide and the discharge of ore/magnetic-particle agglomerates takes place particularly quickly from the accumulation region 4. Alternatively, a continuous discharge of the ore/magnetic-particle agglomerates may also take place, in that ore/magnetic-particle agglomerates are constantly guided or routed out of the pulp P into the collection region or into the fluid guide.

Figure 3:
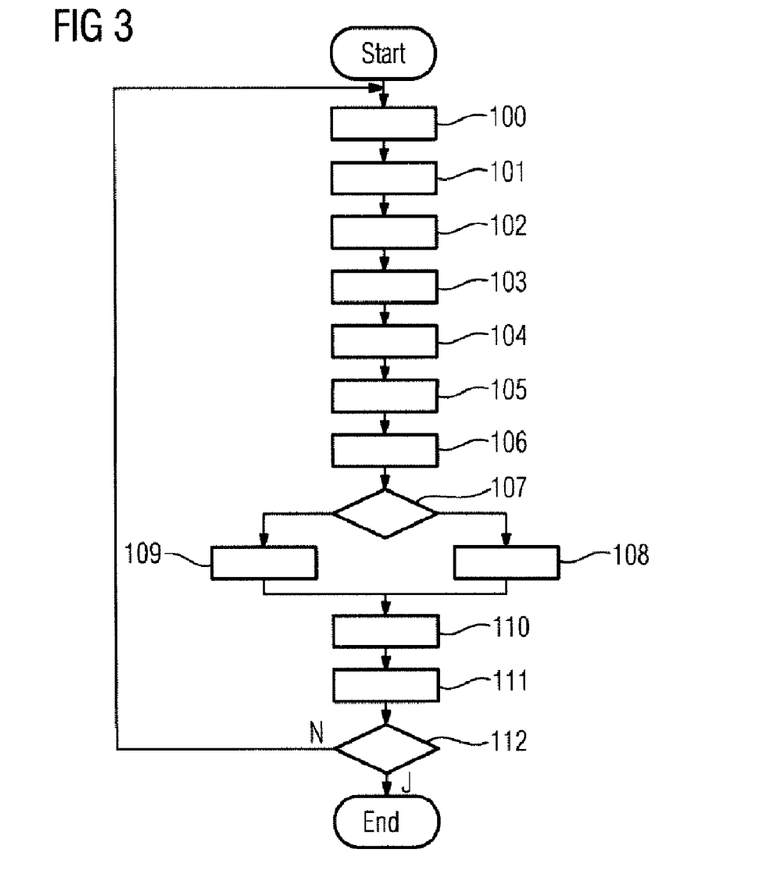
FIG. 3 shows a flowchart for illustrating an exemplary sequence of the method according to various embodiments.

FIG. 3 shows a flowchart for illustrating the diagrammatic sequence of an exemplary method for the extraction of non-magnetic ores.

The method is based on the fact that pulp can be supplied to the reactor shown in FIG. 1 and pulp is provided for the extraction of non-magnetic ores. In a first method step 100, pulp flows through the reactor.

The throughflow, set in method step 100, of the pulp in the reactor is preferably carried out virtually simultaneously with method step 101 in which the flow of the pulp through the reactor is set turbulently. The advantage of this is that a high intermixing of the pulp takes place, and, furthermore, magnetic field-free spaces with an insignificant spatial extent, where appropriate brought about by the means for generating a magnetic field which moves the ore/magnetic-particle agglomerates present in the pulp at this time point into an accumulation region of the reactor, have less or no importance for ore extraction. Magnetic field-free spaces may be necessary in order in the reactor to improve the force profile which is illustrated as F~BdegrB, F being the force and B being the magnetic flux density.

The turbulent throughflow of the reactor may be generated, for example, by the setting of a correspondingly high flow velocity of the pulp. Structural measures on the reactor are also suitable for causing vortices in the pulp.

In a method step 102, a measurement of at least one state variable of the pulp, which influences ore extraction, in particular ore extraction output, takes place. This may, for example, be an average ore particle size. In addition, preferably, an average concentration for ore particles not yet present in the form of ore/magnetic-particle agglomerates in the pulp is also determined. A plurality of measurements may also be carried out at different locations of the reactor, preferably in the flow direction of the pulp, and, based on these, a control/regulation of the supply of magnetic particles and/or additives may take place.

It is especially advantageous that the concentration and/or spatial distribution of magnetic particles in the pulp are/is detected, and that the operation of at least one magnet of the reactor 1 is controlled and/or regulated as a function of the detected concentration and/or distribution.

In the present case, the pulp has already been acted upon by magnetic particles and hydrophobizing agents in an ore mill during the grinding of the ore. The addition, controlled on the basis of the determined state variable, of magnetic particles in method step 103 and of hydrophobizing agents in method step 104 into the pulp is therefore only supplementary in the present case. However, the entire supply of magnetic particles and additives may also take place inside the reactor or shortly upstream of the reactor in a separate mixing device.

The pulp treated in this way is then introduced in a method step 105 into a plurality of flow ducts. This makes it possible to have a high throughput, suitable for mining operation, by means of the method according to various embodiments.

In a next method step 106, the ore/magnetic-particle agglomerates present in the pulp are moved, in each flow duct through which pulp flows, into the existing accumulation regions of the respective flow duct by means of a plurality of magnetic fields succeeding one another in the flow direction.

The ore/magnetic-particle agglomerations are discharged from these accumulation regions discontinuously in a method step 108 or continuously in a method step 109. Whether a discontinuous or continuous discharge from a specific accumulation region is to take place is decided in a method step 107. The ore/magnetic-particle agglomerates are routed out of the accumulation region into a collection region.

In the collection region or in a separation device provided separately for this purpose, the ore/magnetic-particle agglomerates are separated into ore particles and magnetic particles in a method step 110 by means of chemical, mechanical, acoustic and/or thermal methods.

When the ore/magnetic-particle agglomerates are separated from one another into ore particles and magnetic particles, the magnetic particles can be reutilized at least partially in a method step 111. In this case, a corresponding treatment or preparation of at least one fraction of the magnetic particles takes place, so that these can form anew ore/magnetic-particle agglomerates when these are fed to the pulp which has ore. The reutilizable magnetic particles are preferably supplemented by a fraction of magnetic particles newly introduced into the apparatus, in order to compensate losses of magnetic particles during the ore extraction process, including the process of separating the ore/magnetic-particle agglomerates.

The method can be terminated, as required. This is interrogated in a method step 112. However, since a continuous method for ore extraction is involved, the method is preferably carried out permanently.

What is claimed is:

1. A method for the extraction of non-magnetic ores from a pulp possessing non-magnetic ore particles and having a solid fraction of at least 30 percent by mass, wherein the pulp flows through a reactor in flow direction, the method comprising:
   supplying the pulp with magnetic or magnetizable magnetic particles to which the non-magnetic ore particles bind to form ore/magnetic-particle agglomerates,
   moving the ore/magnetic-particle agglomerates by means of a magnetic field into an accumulation region of the reactor,
   discharging the ore/magnetic-particle agglomerates from the accumulation region of the reactor,
   breaking the bonds between the ore particles and the magnetic particles of the ore/magnetic-particle agglomerates to separate the ore/magnetic-particle agglomerates into ore particles and magnetic particles, and
   treating the separated magnetic particles in such a way that, upon subsequent interaction with non-magnetic ore particles, they form new ore/magnetic-particle agglomerates.

2. The method according to claim 1, wherein the separated magnetic particles are removed from an interaction region of the separated ore particles.

3. The method according to claim 1, wherein the ore/magnetic-particle agglomerates are moved, by means of a plurality of magnetic fields following one another in the flow direction, into accumulation regions of the reactor which are separated from one another.

4. The method according to claim 1, wherein the magnetic particles and/or the ore particles are hydrophobized.

5. The method according to claim 1, wherein the pulp flows through the reactor turbulently.

6. The method according to claim 1, wherein the ore/magnetic-particle agglomerates are discharged continuously into a collection region by means of at least one of a magnetic field and flow-related measures.

7. A method for the extraction of non-magnetic ores from a pulp possessing non-magnetic ore particles and having a solid fraction of at least 30 percent by mass, wherein the pulp flows through a reactor in flow direction, the method comprising:
   supplying the pulp with magnetic or magnetizable magnetic particles with which the non-magnetic ore particles form ore/magnetic-particle agglomerates,
   moving the ore/magnetic-particle agglomerates by means of a magnetic field into an accumulation region of the reactor,
   discharging the ore/magnetic-particle agglomerates from the accumulation region of the reactor into a collection region, wherein the ore/magnetic-particle agglomerates are discharged into the collection region discontinuously by means of at least one of a magnetic field and flow-related measures,
   separating the ore/magnetic-particle agglomerates into ore particles and magnetic particles, and
   treating the separated magnetic particles in such a way that, upon subsequent interaction with non-magnetic ore particles, they form new ore/magnetic-particle agglomerates.

8. The method according to claim 1, wherein the ore/magnetic-particle agglomerates are separated into ore particles and magnetic particles by means of at least one of chemical, mechanical, acoustic and thermal methods.

9. The method according to claim 8, wherein the separation of magnetic particles and ore particles takes place by means of ultrasound.

10. The method according to claim 1, wherein the magnetic particles separated from ore/magnetic-particle agglomerates are supplied anew to the pulp.

11. The method according to claim 1, wherein the pulp flows through a plurality of flow ducts separated from one another and, in terms of flow, connected in parallel, wherein the flow ducts being acted upon by at least one magnetic field, respectively which moves ore/magnetic-particle agglomerates in the respective flow duct into at least one accumulation region.

12. A method for the extraction of non-magnetic ores from a pulp possessing non-magnetic ore particles and having a solid fraction of at least 30 percent by mass, wherein the pulp flows through a reactor in flow direction, the method comprising:
    detecting a state variable for the pulp,
    supplying the pulp with magnetic or magnetizable magnetic particles with which the non-magnetic ore particles form ore/magnetic-particle agglomerates,
    moving the ore/magnetic-particle agglomerates by means of a magnetic field into an accumulation region of the reactor,
    wherein at least one of: (a) the supply of at least one of the magnetic particles, further additives, and means for hydrophobizing at least one of the magnetic particles and the non-magnetic ore particles, and (b) the operation of at least one magnet moving the ore/magnetic particle agglomerates into the accumulation region is controlled or regulated based at least on the detected state variable for the pulp,
    discharging the ore/magnetic-particle agglomerates from the accumulation region of the reactor,
    separating the ore/magnetic-particle agglomerates into ore particles and magnetic particles, and
    treating the separated magnetic particles in such a way that, upon subsequent interaction with non-magnetic ore particles, they form new ore/magnetic-particle agglomerates.

13. The method according to claim 1, wherein the pulp is supplied with magnetic particles before the pulp enters the reactor or during a grinding operation for the grinding of ore.

14. An apparatus for the continuous extraction of non-magnetic ores from a pulp possessing non-magnetic ore particles and having a solid fraction of at least 30 percent by mass, comprising
    a reactor serving for the reception of pulp, wherein the pulp is supplied with magnetic particles to which ore particles bind to form ore/magnetic-particle agglomerates,
    means for generating a magnetic field which is configured in such a way that ore/magnetic-particle agglomerates are moved in to at least one accumulation region of the reactor,
    a device for discharging the ore/magnetic-particle agglomerates from the at least one accumulation region to at least one collection region,
    a device for breaking the bonds between the ore particles and the magnetic particles of the ore/magnetic-particle agglomerates to separate the ore/magnetic-particle agglomerates into ore particles and magnetic particles, and
    a treatment device designed for the treatment of magnetic particles separated from ore/magnetic-particle agglomerates, wherein the separated magnetic particles are capable of being treated thereby in such a way that, upon subsequent interaction with non-magnetic ore particles, the separated magnetic particles form new ore/magnetic-particle agglomerates.

15. The apparatus according to claim 14, wherein the reactor is designed in such a way that a definable pulp volume flow, of at least 7000 cubic meters per hour, or 10 000 cubic meters per hour to 15 000 cubic meters per hour, can flow through it.

16. The apparatus according to claim 14, wherein the reactor is connected fluidically to the at least one collection region.

17. The apparatus according to claim 14, wherein the separation device has ultrasonic transmitters for emission of ultrasound, the emission power of which can be set in such a way that ore/magnetic-particle agglomerates can be separated into magnetic particles and ore particles.

18. The apparatus according to claim 14, wherein the discharge device has means for generating a magnetic field, which is designed in such a way that the ore/magnetic-particle agglomerates are discharged, guided magnetically, out of the at least one accumulation region.

19. The apparatus according to claim 14, wherein the reactor comprises a plurality of flow ducts separated from one another and, in flow terms, connected in parallel.

20. The apparatus according to claim 19, wherein at least one of the number and configuration of the plurality of flow ducts are/is determined in such a way that the following equation is fulfilled:

$$\dot{V}_{mindes} \leq \sum_{i=1}^{n} \dot{V}_i,$$

in which $\dot{V}_{min\ des}$ is the minimum desired volume flow through the apparatus, and $\dot{V}_i$ is the volume flow through the i-th flow duct, i being a whole number.

21. The apparatus according to claim 19, wherein, during operation, essentially the same volume flow flows through the plurality of flow ducts, and the number of flow ducts is determined according to:

$$\frac{\dot{V}_{mindes}}{\dot{V}_i} \leq n$$

in which $\dot{V}_{min\ des}$ is the minimum desired volume flow through the apparatus, and $\dot{V}_i$ is the same volume flow through all the i flow ducts which the flow passes, n, i being whole numbers.

22. The apparatus according to claim 18, wherein the plurality of flow ducts have means for generating a magnetic field, respectively moving ore/magnetic-particle agglomerates into the at least one accumulation region to which the respective flow duct relates.

23. The apparatus according to claim 19, wherein at least one flow duct of the plurality of flow ducts has a closing element for opening and closing the at least one flow duct, so that, in the closed state of the closing elements assigned to the at least one flow duct, the pulp cannot flow through the at least one flow duct.

24. The apparatus according to claim 14, comprising a device for the production of magnetic particles which, upon contact with ore particles, form ore/magnetic-particle agglomerates.

* * * * *

UNITED STATES PATENT AND TRADEMARK OFFICE
CERTIFICATE OF CORRECTION

PATENT NO. : 8,342,336 B2  
APPLICATION NO. : 12/867710  
DATED : January 1, 2013  
INVENTOR(S) : Michael Diez et al.

Page 1 of 1

It is certified that error appears in the above-identified patent and that said Letters Patent is hereby corrected as shown below:

Title page,
Item (73) Assignee, "Siemens Aktiengesellschaft, Munich (DE)" should
read -- Siemens Aktiengesellschaft, Munich (DE) AND BASF SE, LUDWIGSHAFEN (DE) --.

Signed and Sealed this
Nineteenth Day of February, 2013

Teresa Stanek Rea
*Acting Director of the United States Patent and Trademark Office*